(12) United States Patent
Takasago

(10) Patent No.: US 9,709,665 B2
(45) Date of Patent: Jul. 18, 2017

(54) RADAR APPARATUS AND SIGNAL PROCESSING METHOD

(71) Applicant: FUJITSU TEN LIMITED, Kobe-shi, Hyogo (JP)

(72) Inventor: Tomoki Takasago, Kobe (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 390 days.

(21) Appl. No.: 14/306,984

(22) Filed: Jun. 17, 2014

(65) Prior Publication Data

US 2015/0346324 A1 Dec. 3, 2015

(30) Foreign Application Priority Data

Jul. 30, 2013 (JP) .................................. 2013-157758

(51) Int. Cl.
| | |
|---|---|
| *G01S 13/34* | (2006.01) |
| *G01S 7/35* | (2006.01) |
| *G01S 13/42* | (2006.01) |
| *G01S 13/58* | (2006.01) |
| G01S 13/93 | (2006.01) |
| G01S 13/72 | (2006.01) |

(52) U.S. Cl.
CPC .............. *G01S 7/354* (2013.01); *G01S 7/352* (2013.01); *G01S 13/34* (2013.01); *G01S 13/345* (2013.01); *G01S 13/42* (2013.01); *G01S 13/584* (2013.01); *G01S 13/931* (2013.01); *G01S 13/72* (2013.01); *G01S 2007/356* (2013.01); *G01S 2013/9342* (2013.01); *G01S 2013/9346* (2013.01)

(58) Field of Classification Search
CPC ........ G01S 7/354; G01S 13/34; G01S 13/931; G01S 13/584; G01S 13/345; G01S 7/352; G01S 13/42; G01S 2007/356; G01S 2013/9342; G01S 2013/9346; G01S 13/72
USPC ........................................................... 342/70
See application file for complete search history.

(56) References Cited

U.S. PATENT DOCUMENTS 6,311,123 B1 * 10/2001 Nakamura ......... B60K 31/0008
123/352
2003/0122703 A1 * 7/2003 Kishida ................. G01S 13/345
342/70

(Continued)

FOREIGN PATENT DOCUMENTS

| JP | 2003-149325 A | 5/2003 |
| JP | A-2003-177177 | 6/2003 |

(Continued)

*Primary Examiner* — Timothy A Brainard
(74) *Attorney, Agent, or Firm* — Oliff PLC

(57) ABSTRACT

There is provided a radar apparatus. A predicting unit predicts a current peak signal based on a pervious determined peak signal. An extracting unit extracts a current peak signal corresponding to the predicted peak signal, from among peak signals existing within a predetermined range of the frequency. A filtering unit performs a filtering process on the predicted peak signal and the current peak signal, and output a result of the filtering process as a current determined peak signal. If the target derived based on the current peak signal is a preceding vehicle existing in front of an own vehicle equipped with the radar apparatus, the filtering unit changes whether to perform the filtering process according to a state of the preceding vehicle.

8 Claims, 13 Drawing Sheets

(56) References Cited

U.S. PATENT DOCUMENTS

| | | | |
|---|---|---|---|
| 2003/0156055 A1* | 8/2003 | Tamatsu | G01S 13/345 342/70 |
| 2003/0179130 A1* | 9/2003 | Kumon | G01S 7/35 342/70 |
| 2004/0125011 A1* | 7/2004 | Kumon | G01S 13/345 342/70 |
| 2007/0040731 A1* | 2/2007 | Kishida | G01S 13/345 342/109 |
| 2007/0153255 A1* | 7/2007 | Ishii | G01S 13/584 356/28 |
| 2008/0122680 A1* | 5/2008 | Morinaga | G01S 7/352 342/109 |
| 2011/0050481 A1* | 3/2011 | Itoh | G01S 13/345 342/27 |

FOREIGN PATENT DOCUMENTS

| | | | | |
|---|---|---|---|---|
| JP | 2004-86287 A | 3/2004 | | |
| JP | 2010-111315 A | 5/2010 | | |
| JP | WO 2012121103 A1 * | 9/2012 | | H04B 1/1036 |
| WO | 2005/066656 A1 | 7/2005 | | |

* cited by examiner

RADAR APPARATUS AND SIGNAL PROCESSING METHOD

CROSS-REFERENCE TO RELATED APPLICATIONS

This application is based on and claims priority from Japanese Patent Application No. 2013-157758 filed on Jul. 30, 2013.

TECHNICAL FIELD

The present invention relates to signal processing for derivation of a target.

BACKGROUND

In the past, a vehicle-mounted radar apparatus derives a position or the like of a target with respect to a vehicle (radar apparatus) by transmitting a transmission wave from a transmitter antenna and receiving a reflection wave from the target by a receiver antenna. Specifically, the radar apparatus generates a beat signal by mixing a transmitting signal corresponding to the transmission wave, of which a frequency is changed in a predetermined cycle, and a receiving signal corresponding to the reflection wave. That is, the radar apparatus generates the beat signal based on a frequency difference (beat frequency) between the transmitting signal and the receiving signal in each period including an up period in which the frequency ascends in a predetermined cycle, and a down period in which the frequency descends in a predetermined cycle.

Then, the radar apparatus generates a signal (transformed signal) for every frequency by processing the beat signal through FFT (Fast Fourier Transform), and extracts a signal exceeding a threshold of a predetermined signal level, as a peak signal, among the transformed signals. The radar apparatus derives paired data by pairing the peak signal of the up period and the peak signal of the down period based on a given condition.

The radar apparatus derives paired data (predicted paired data) predicting the current paired data based on the paired data derived in the previous process. The radar apparatus determines whether or not a temporally continuous relationship exists between the predicted paired data and the current paired data. If an actual measured position derived from the current paired data is contained in a predetermined range centered on a predicted position derived from the predicted paired data, the radar apparatus determines that the temporally continuous relationship exists. If each paired data has the temporally continuous relationship, the radar apparatus performs a filtering process on the predicted paired data and the current paired data, and derives the paired data on which the filtering process has been performed as currently determined paired data.

The radar apparatus outputs information, such as position information and relative speed of the target derived from the currently determined paired data, to a vehicle control device, and the vehicle control device performs a necessary vehicle control according to the information about the vehicle. For example, a technique associated with the present invention is disclosed in Patent Document 1.

Patent Document 1: Japanese Patent Application Publication No. 2003-177177A

However, for example, in a case where a preceding vehicle stopped ahead starts, the conventional filtering process has a problem in that since a predicted position and an actual measured position are separated from each other, the temporally continuous relationship is disappeared.

It will be specifically described with reference to FIGS. 1 and 2. FIGS. 1 and 2 are diagrams illustrating the process of determining the current paired data of the preceding vehicle. In FIGS. 1 and 2, "definite values" indicate the determined paired data, "predicted values" indicate paired data predicting the current paired data, and "actual measured values" indicate the current paired data. FIGS. 1 and 2 show schematically the position derived from each paired data. Further, "t" attached to each value indicates a time representing a timing of the deriving process.

The radar apparatus judges whether or not an actual measured value (t) is contained in a predicted range around a predicted value (t). If it is YES, the radar apparatus judges that each value has the temporally continuous relationship. If there is the temporally continuous relationship, the radar apparatus performs the filtering process on the predicted value (t) and the actual measured value (t) to derive a current definite value (t). That is, the current determined paired data is derived.

However, in a case where the preceding vehicle is stopped, as illustrated in FIG. 1, since the previous definite value (t−1) is the stop state, the predicted value (t) is predicted as the stop state, so that the previous definite value (t−1) and the predicted value (t) become the same position. If the preceding vehicle starts in this state, since the predicted value (t) and the actual measured value (t) are separated, the values have the temporally consecutive relationship, but the definite value (t) is pulled close to the predicted position rather than its original position by the filtering process. In the next target deriving process, since a predicted value (t+1) is derived on the basis of the definite value (t), as illustrated in FIG. 2, the current measured value (t+1) is not contained in the predicted range around the predicted value (t+1), and thus there is no temporally continuous relationship. As a result, despite the paired data indicative of the same target as the preceding target, the radar apparatus cannot judge that it is the same target, so that the preceding vehicle is disappeared.

SUMMARY

An object of the present invention is to a technique capable of preventing that a preceding vehicle is disappeared when the preceding vehicle starts from a stop state.

(1) According to an aspect of the embodiments of the present invention, there is provided a radar apparatus capable of extracting peak signals obtained from a difference frequency between a transmitting signal of which a frequency is changed in a predetermined cycle and a receiving signal obtained by receiving a reflection wave of a transmission wave based on the transmitting signal at a target, for a first period at which the frequency of the transmitting signal ascends and for a second period at which the frequency descends, and deriving information about the target based on the extracted peak signals, the radar apparatus comprising: a predicting unit configured to predict a current peak signal based on a pervious determined peak signal; an extracting unit configured to extract a current peak signal corresponding to the predicted peak signal, from among peak signals existing within a predetermined range of the frequency; and a filtering unit configured to perform a filtering process on the predicted peak signal and the current peak signal, and output a result of the filtering process as a current determined peak signal, wherein if the target derived based on the current peak signal is a preceding vehicle existing in front of an own vehicle equipped with the radar apparatus, the filtering unit changes whether to perform the filtering process according to a state of the preceding vehicle.

(2) If the state of the preceding vehicle is changed from a stop state to a start state, the filtering unit may output the current peak signal as the current determined peak signal without performing the filtering process.

(3) If, among the information about the target derived based on the current peak signal, a level of a peak signal regarding an angle is equal to or more than a threshold value, a vertical distance is equal to or less than a first predetermined distance corresponding to a distance in a case where the preceding vehicle is changed from the stop state to the start state, a horizontal distance is within a predetermined distance representing that the preceding vehicle is positioned in the same traffic lane as the own vehicle, and a speed of the preceding vehicle is within a predetermined speed corresponding to a speed in the case where the preceding vehicle is changed from the stop state to the start state, the filtering unit may judge that the preceding vehicle is changed from the stop state to the start state, and then output the current peak signal as the current determined peak signal without performing the filtering process.

(4) If a relative speed of the preceding vehicle is changed from 0 km/h to a state which is not 0 km/h, the filtering unit may output the current peak signal as the current determined peak signal without performing the filtering process.

(5) If, among the information about the target derived based on the current peak signal, a level of a peak signal regarding an angle is equal to or more than a threshold value, a vertical distance is equal to or less than a first predetermined distance corresponding to a distance in a case where the preceding vehicle is changed from the stop state to the start state, and a horizontal distance is within a predetermined distance representing that the preceding vehicle is positioned in the same traffic lane as the own vehicle, the filtering unit may judge that the relative speed of the preceding vehicle is changed from 0 km/h to a state which is not 0 km/h since the preceding vehicle starts from the stop state, and then output the current peak signal as the current determined peak signal without performing the filtering process.

(6) If, among the information about the target derived based on the current peak signal, a level of a peak signal regarding an angle is equal to or more than a threshold value, a vertical distance is equal to or less than a second predetermined distance representing that the preceding vehicle is normally traveling, and a horizontal distance is within a predetermined distance representing that the preceding vehicle is positioned in the same traffic lane as the own vehicle, the filtering unit may judge that the relative speed of the preceding vehicle is changed from 0 km/h to a state which is not 0 km/h since the preceding vehicle decelerates or accelerates while the own vehicle follows up the preceding vehicle, and then output the current peak signal as the current determined peak signal, without performing the filtering process.

(7) According to another aspect of the embodiments of the present invention, there is provided a According to the configurations set forth in (1) to (7), since whether to perform the filtering process is changed according to the state of the preceding vehicle, the target exists at a position apart from an originally existing position, and thus it is possible to prevent the current paired data being determined. As a result, it is possible to preventing the preceding vehicle from being disappeared in the deriving process after the next process.

Further, according to the configurations set forth in (2) to (6), in the case where there is high possibility that the preceding vehicle is disappeared, such as a case where the preceding vehicle is changed from the stop state to the start state, or a case where the preceding vehicle is accelerated or decelerated, since the current peak signal is outputted as the determined peak signal, without performing the filtering process, it is possible to prevent the current paired data from being determined at the position apart from the original position.

BRIEF DESCRIPTION OF THE DRAWINGS

In the accompanying drawings.

DETAILED DESCRIPTION OF THE EMBODIMENTS

Hereinafter, embodiments of the present invention will now be described with reference to the accompanying drawings.

1. First Embodiment

Figure 3:
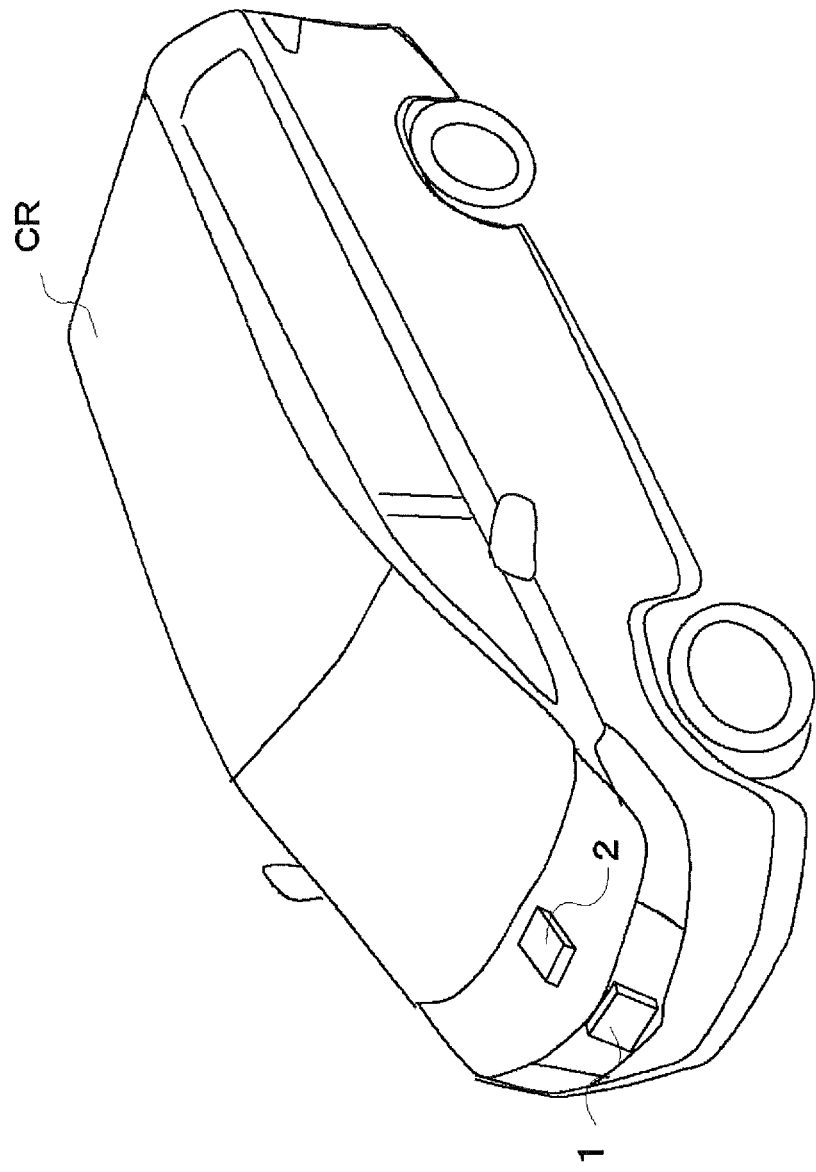
FIG. 3 is a diagram of an overall vehicle.

<1-1. Configuration>
First of all, each configuration of the present invention will now be described. FIG. 3 is a view of an overall vehicle CR. The vehicle CR usually includes a radar apparatus 1 and a vehicle control device 2 which are provided in a vehicle control system 10 according to this embodiment. The radar apparatus 1 is installed at a front portion of the vehicle CR. The radar apparatus 1 scans a desired scanning scope through once scanning to derive a distance between the vehicle CR and a target. The distance to be derived has a distance corresponding to a vehicular traveling direction and a distance corresponding to a horizontal direction (vehicular width direction) of the vehicle.

The distance corresponding to the vehicular traveling direction is a distance (vertical distance) when a reflection wave from the target arrives at a reception antenna of the radar apparatus 1. Also, the distance corresponding to the horizontal direction (vehicular width direction) of the vehicle is a distance (horizontal distance) of the target with respect to the vehicle CR in a direction substantially perpendicular to a reference axis BL which imaginarily extends in the traveling direction of the vehicle CR. In this instance, the horizontal distance is derived by performing a trigonometric operation function based on information about an angle of the target with respect to the vehicle CR and the vertical distance. In this way, the radar apparatus 1 derives information about the position of the target with respect to the vehicle CR. Further, the radar apparatus 1 derives a relative speed which is a speed of the target with respect to the speed of the vehicle CR.

Figure 1:
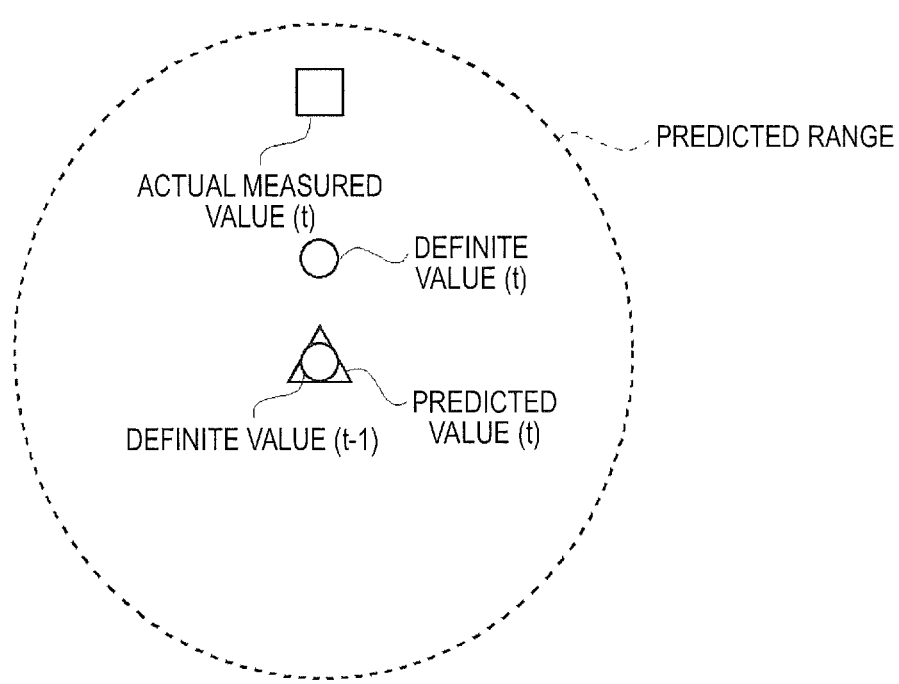
FIG. 1 is a diagram illustrating a process of determining paired data according to the related art.
Figure 1:
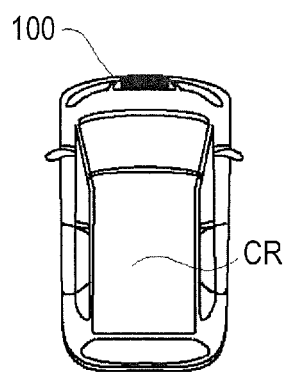
Figure 2:
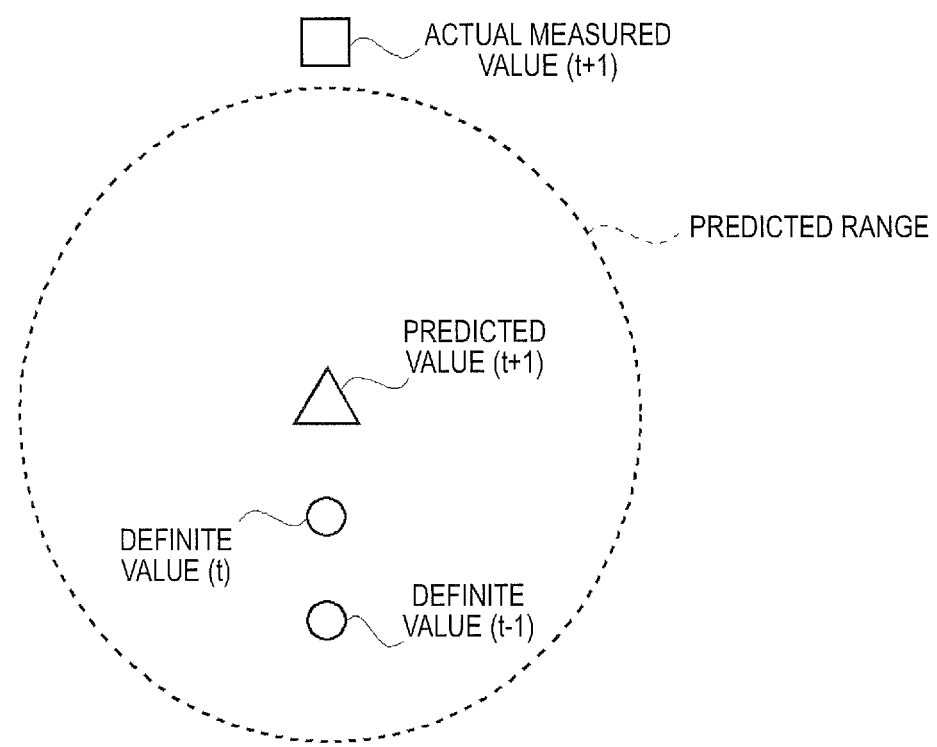
FIG. 2 is a diagram illustrating a process of determining paired data according to the related art.
Figure 2:
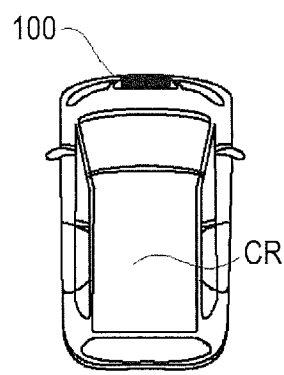

On the other hand, a mounting position of the radar apparatus 1 in FIG. 1 is near a bumper in front of the vehicle, but is not limited thereto. As long as the mounting position derives the target according to a purpose of controlling the vehicle CR by the vehicle control device 2 which will be described later, other mounting position, for example, near a bumper in rear of the vehicle CR or near a side mirror of a lateral portion of the vehicle CR, is possible.

The vehicle control device 2 is an ECU (Electronic Control Unit) for controlling each device of the vehicle CR.

Figure 4:
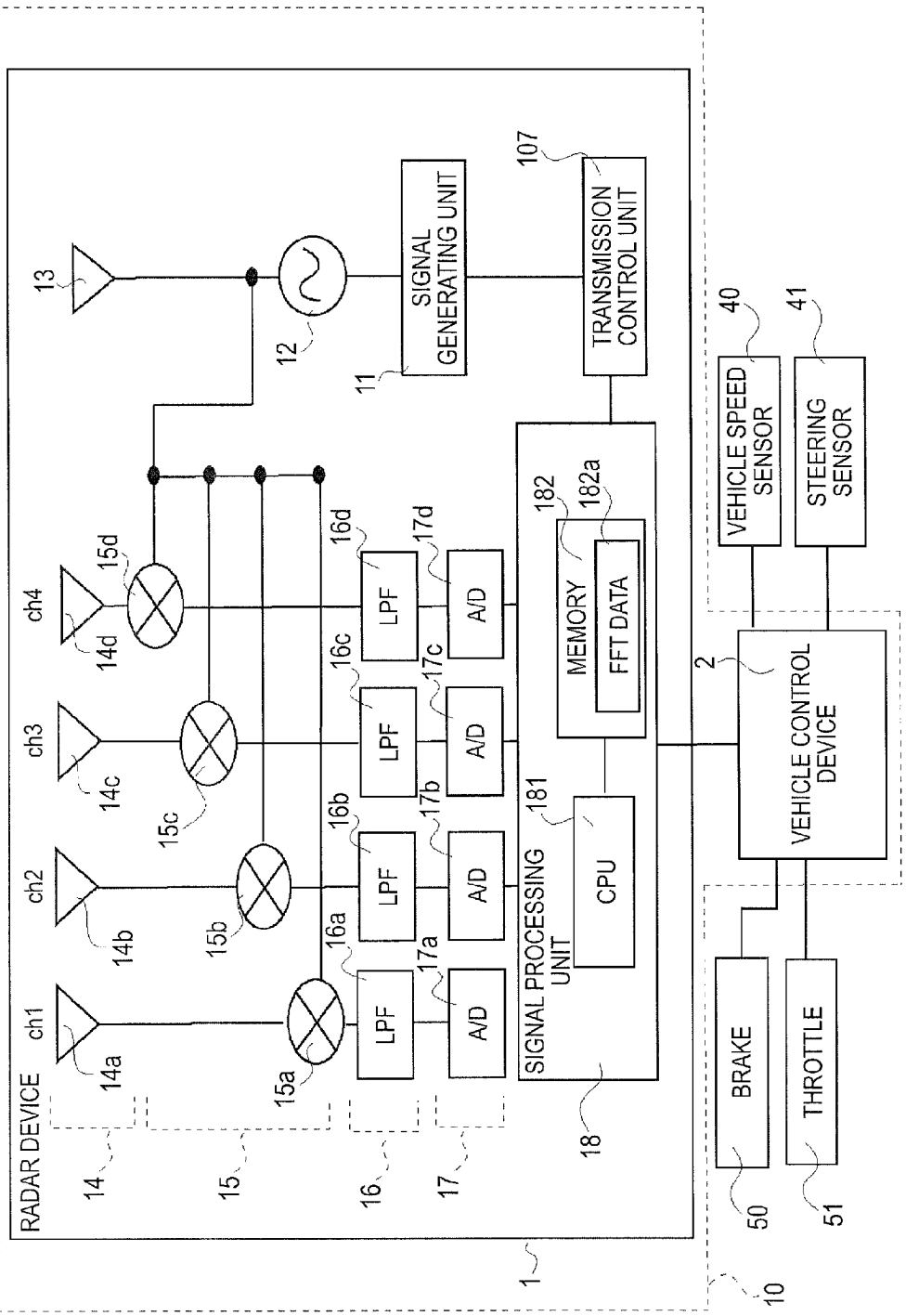
FIG. 4 is a block diagram of a vehicle control system.

FIG. 4 is a block diagram of the vehicle control system 10. The vehicle control system 10 includes the radar apparatus 10 and the vehicle control device 2. The radar apparatus 1 and the vehicle control device 2 are electrically connected to each other, and the target information including the position information and the relative information is transmitted from the radar apparatus 1 to the vehicle control device 2. That is, the radar apparatus 1 outputs the target information including the vertical distance, the horizontal distance, and the relative speed of the target with respect to the vehicle CR to the vehicle control device 2.

The radar apparatus 1 includes a signal generating unit 11, an oscillator 12, a transmission antenna 13, a reception antenna 14, a mixer 15, an LPF (Low Pass Filter), an AD (Analog/Digital) converter 17, and a signal processing unit 18.

The signal generating unit 11 generates a modulated signal, for example, of which a voltage is changed in a triangular-wave shape, based on a control signal of a transmission control unit 107 which will be described later.

The oscillator 12 is a voltage control oscillator for controlling an oscillation frequency with a voltage. The oscillator 12 frequency-modulates a signal of a given frequency (e.g., 76.5 GHz), based on the modulated signal generated from the signal generating unit 11, to output it to the transmission antenna 13 as a transmitting signal of a frequency band of which a center frequency is the given frequency band (76.5 GHz).

The transmission antenna 13 is an antenna for outwardly outputting a transmitting wave regarding the transmitting signal from the vehicle. The transmission antenna 13 is connected to the oscillator 12, and outputs continuously the transmission wave corresponding to the transmitting signal inputted from the oscillator 12 to the outside of the vehicle.

The reception antenna 14 is a plurality of array antennas receiving a reflection wave coming from the object at which the transmission wave continuously transmitted from the transmission antenna 13 is reflected. In this embodiment, the reception antenna 14 includes four reception antennas, that is, reception antennas 14a(ch1), 14b(ch2), 14c(ch3) and 14d(ch4). Each of the reception antennas 14a to 14d is arranged at regular intervals.

The mixer 15 is provided at each of the reception antennas 14a to 14d, and mixes the receiving signal and the transmitting signal. When the receiving signal and the transmitting signal are mixed, the mixer 15 generates a beat signal which is a difference between both signals, to output it to the LPF 16.

The LPF 16 is a filter for reducing a component of a frequency higher than the given frequency, without reducing a component of a frequency lower than the given frequency. In this instance, the LPF 16 is also provided at each of the reception antennas 14a to 14d, similar to the mixer 15.

The AD converter 17 converts the beat signal of an analog signal into a digital signal. The AD converter 17 derives a plurality of sampling data by sampling the beat signals of the analog signal in a predetermined cycle. Further, the AD converter 17 quantizes the sampling data to convert the beat signal of the analog signal into a digital data, and outputs the beat signal of the digital signal to the signal processing unit 18. Similar to the mixer 15, the AD converter 17 is also provided at each of the reception antennas 14a to 14d.

The signal processing unit 18 is a computer including a CPU 181 and a memory 182. The signal processing unit 18 FFT processes the beat signal of the digital signal outputted from the AD converter 17 to acquire FFT data, and extracts a signal of a signal level exceeding a predetermined threshold as a peak signal, among the plurality of beat signals of FFT data. The signal processing unit 17 drives target information by pairing the peak signal of an up period and the peak signal of a down period The memory 182 is stored with an execution program, such as various computation processes executed by the CPU 181. Further, the memory 182 is stored with plural target information derived by the signal processing unit 18. For example, the memory is stored with target information (vertical distance, horizontal distance, and relative speed of target) derived in the previous process and the current process. The memory 182 contains FFT data acquired by the previous target deriving process, as well as FFT data acquired by the current target deriving process.

The transmission control unit 107 is connected to the signal processing unit 18, and outputs the control signal to the signal generating unit 11 for generating a modulated signal, based on the signal from the signal processing unit 18.

The vehicle control device 2 controls operations of various devices provided in the vehicle CR. The vehicle control device 2 is electrically connected to various sensors, such as a vehicle speed sensor 40 and a steering sensor 41, provided in the vehicle CR, and obtains information from these sensors. Further, the vehicle control device 2 is electrically connected to various devices, such as a brake 50 and a throttle 51, provided in the vehicle CR. The vehicle control device 2 controls the behavior of the vehicle CR by operating various devices, based on the information obtained from various sensors and the target information obtained from the signal processing unit 18 of the radar apparatus 1.

An example of the vehicle control performed by the vehicle control device 2 is as follows. In a case where the vehicle CR follow-up drives the preceding vehicle which is moving in the same traffic, the vehicle control device 2 controls the vehicle CR to follow up the preceding vehicle. Specifically, the vehicle control device 2 controls at least one of brake 50 and the throttle 51 to perform the control of ACC (Adaptive Cruise Control) which allows the vehicle CR to follow-up drive the preceding vehicle in the state of securing a given inter-vehicular distance between the vehicle CR and the preceding vehicle.

Further, according to another example, the vehicle control device 2 performs the control of protecting passengers of the vehicle CR in preparation for collision of the vehicle against an obstacle. Specifically, in a case where there is danger that the vehicle CR collides with an obstacle, the vehicle control device 2 warns a passenger of the vehicle CR by use of an alarm device, or performs a control of PCS (Pre-crash Safety System) by controlling the brake 50 to reduce the speed of the vehicle CR. Further, the vehicle control device 2 performs the control of the PCS by fixing the passenger to a seat by a seat belt or fixing a headrest to reduce damage of the passenger against an impact when collision occurs.

<1-2. Overall Processing>

Figure 5:
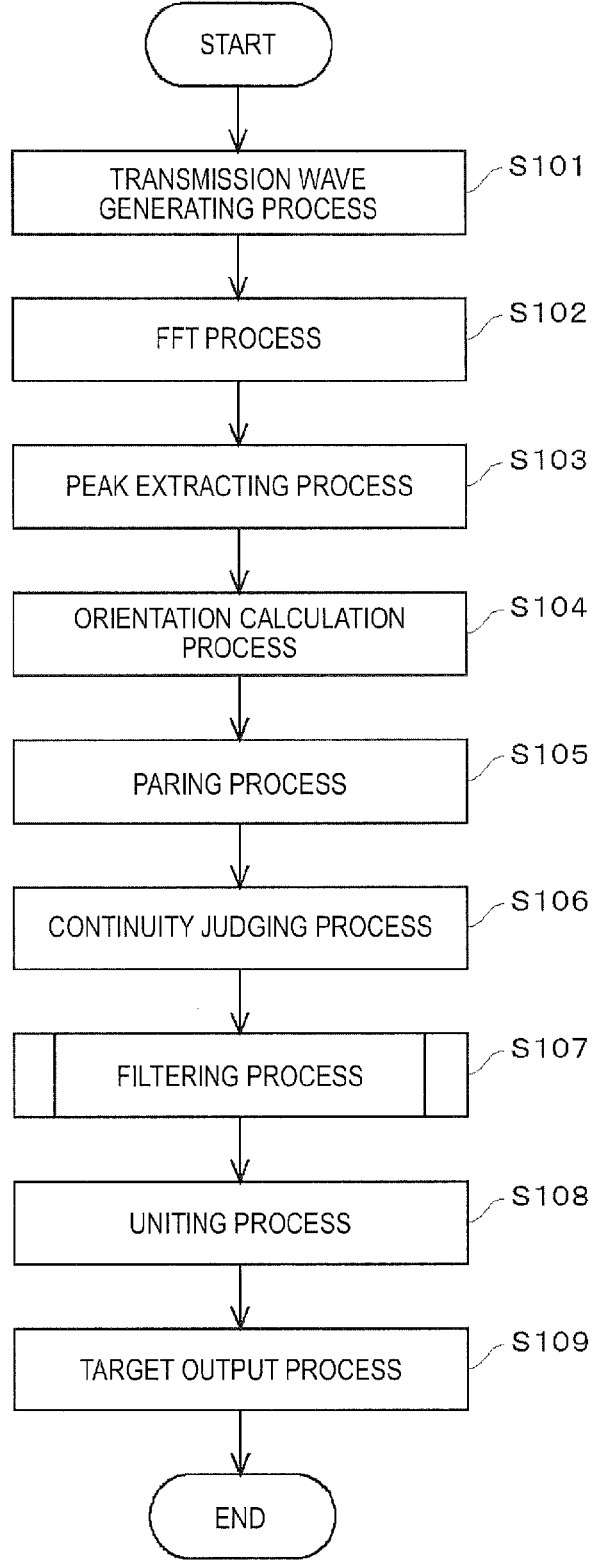
FIG. 5 is flowchart illustrating a process of deriving target information.

Next, the process of deriving the target information by the radar apparatus 1 will be described. FIG. 5 is a flowchart of which the signal processing unit 18 performs the process of deriving the target information.

First, he signal processing unit 18 outputs an instruction signal capable of generating the transmission wave to the transmission control unit 107 (step S101). The signal generating unit 11 is controlled by the transmission control unit 107 to which the instruction signal is input from the signal processing unit 18, so that the transmission wave corresponding to a transmitting signal TX is generated. The generated transmission wave is output outwardly from the vehicle.

The reception antenna 14 receives the reflection wave coming from the target at which the transmission wave reflects, and the mixer 15 mixes the transmitting signal TX and the receiving signal RX corresponding to the reflection wave to generate the beat signal which is a difference between the transmitting signal and the receiving signal. The beat signal BS of the analog signal is filtered by the LPF 16, and is converted into the digital data by the AD converter 17 to input to the signal processing unit 18.

Figure 6:
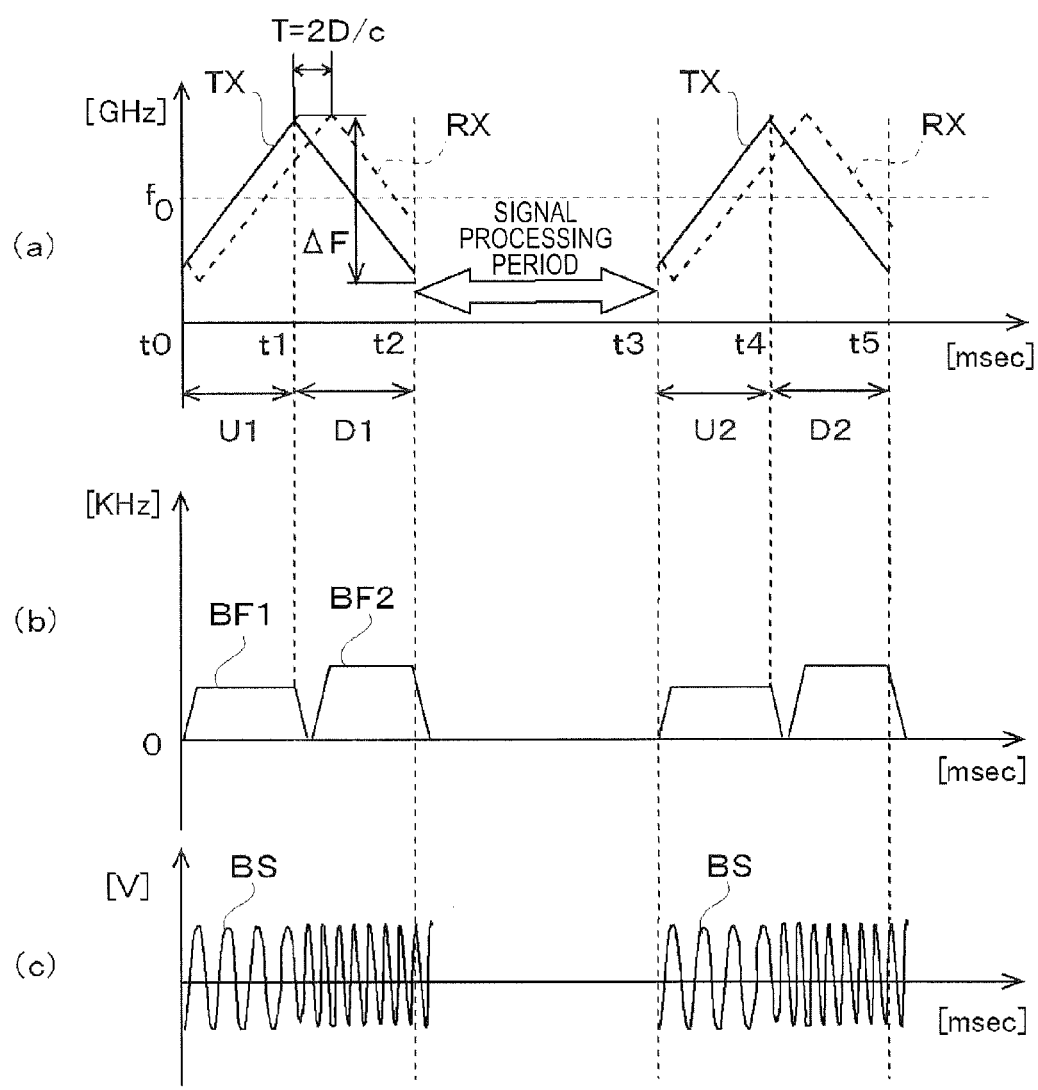
FIG. 6 is a view illustrating an FW-CW mode signal.

The method of generating the beat signal will now be described in detail. FIG. 6 is a diagram illustrating the method of generating beat signal. FIG. 6 uses a signal processing method of FM-CW (Frequency Modulated Continuous Wave) as an example. Although the FM-CW method will be described as an example in this embodiment, the present invention is not limited to this method, as long as any method of deriving the target by combining a plurality of periods such as an up period, in which the frequency of the transmitting signal ascends, and a down period, in which the frequency of the transmitting signal descends.

In FIG. 6, TX denotes the transmitting signal, and RX denotes the receiving signal. Further, Fo denotes a center frequency of the transmission wave, and OF denotes frequency deviation width. Also, T denotes a reciprocating time of a wave between the vehicle CR and the target.

(a) in FIG. 6 is a diagram illustrating signal waveforms of the transmitting signal TX and the receiving signal RX of the FM-CW mode, in which a horizontal axis represents a time (msec), and a vertical axis represents a frequency (GHz). The transmitting signal TX repeats a constant change between 200 MHz, for example, it descends to a predetermined frequency (e.g., 76.6 GHz) and then ascends up to a predetermined frequency (e.g., 76.4 GHz), with a center frequency being f0. In this way, the transmitting signal TX has a period (hereinafter referred to as an up period), in which the frequency ascends up to a predetermined frequency, and a period (hereinafter referred to as a down period), in which the frequency descends to a predetermined frequency. For example, in (a) of FIG. 6, periods U1 and U2 are the up period, while periods D1 and D2 are the down period.

Further, if the transmission wave transmitted from the transmission antenna 13 is reflected from the object, and then is received by the reception antenna 14 as the reflection wave, the receiving signal RX corresponding to the reflection wave is input to the mixer 15. Similar to the transmitting signal TX, the receiving signal RX also has an up period in which the frequency ascends up to a predetermined frequency, and a down period in which the frequency descends to a predetermined frequency.

In this embodiment, a combination of any up period and a subsequent down period is one cycle of the transmitting signal TX, and the radar apparatus 1 transmits the transmission wave corresponding to one cycle of the transmitting signal TX outwardly from the vehicle. In the example illustrated in (a) in FIG. 6, the radar apparatus 1 outputs the transmission wave at the period U1 of the up period at transmitting periods t0 to t1 and the period D1 of the down period at transmitting periods t1 to t2. The signal processing unit 18 performs the signal processing to derive the target information based on the transmitting signal TX and the receiving signal RX (signal processing periods t2 to t3). After that, the radar apparatus 1 outputs the transmission wave of the next cycle (period U2 of the up period at transmitting periods t3 to t4 and period D2 of the down period at transmitting periods t4 to t5), and the signal processing unit 18 performs the signal processing to derive the target information. Subsequently, the same process is repeated.

In this instance, a temporal delay (time T) occurs in the receiving signal RX relative to the transmitting signal TX in accordance with the distance of the target with respect to the vehicle CR. In addition, if there is a speed difference between the speed of the vehicle CR and the speed of the target, a difference occurs between the transmitting signal TX and the receiving signal RX by Doppler shift.

(b) in FIG. 6 shows a beat frequency generated by the difference between the transmitting signal TX and the receiving signal RX in the up period and the down period, in which a vertical axis represents a frequency (kHz), and a horizontal axis represents a time (msec). For example, a beat frequency BF1 is derived in the period U1, while a beat frequency BF2 is derived in the period D1. The beat frequency is derived in each period.

(c) in FIG. 6 shows a beat signal corresponding to the beat frequency, in which a vertical axis represents amplitude (V), while a horizontal axis represents a time (msec). As shown in (c) in FIG. 6, a beat signal BS of an analog signal is generated as a signal corresponding to the beat frequency. After the beat signal BS is filtered by the LPF 16, it is converted into digital data by the AD converter 17.

In this instance, FIG. 6 shows the beat signal BS corresponding to the receiving signal RX in the case of receiving it from one reflective point. However, in the case where the transmission wave is reflected from a plurality of reflective points and thus the reception antenna 14 receives a plurality of reflection waves, a signal corresponding to the plurality of reflection waves is detected as the receiving signal RX. In this instance, the beat signal BS is synthesized by each difference between the plurality of receiving signals RX and the plurality of transmitting signals TX.

Returning to FIG. 5, the signal processing unit 18 performs the FFT process on the beat signal of the digital data (step S102). Specifically, the signal processing unit 18 performs the FFT process on each beat signal of the up period and the down period. Accordingly, the signal processing unit 18 acquires FFT data having a value of the signal level and phase information about the beat signal for every frequency. In this instance, the FFT data is acquired for every reception antennas 14*a* to 14*d*.

Subsequently, the signal processing unit 18 extracts the beat signal, of which the value of the signal level exceeds the given threshold, among the beat signals of FFT data (step S103). Through this processing, the peak signal is respectively extracted from the up period and the down period, and thus the number of peak signals is determined.

The signal processing unit 18 performs orientation calculation based on the peak signal in each period of the up period and the down period (step S104). Specifically, the signal processing unit 18 derives the orientation (angle) of the target by a given orientation calculating algorithm. For example, the orientation calculating algorithm is ESPRIT (Estimation of Signal Parameters via Rotational Invariance Techniques). A proper value, a proper vector or the like of a correlation matrix is calculated from the phase information of the received signal in each of the reception antennas 14a to 14d, and an angle θup corresponding to the peak signal of the up period and an angle θdn corresponding to the peak signal of the down period are derived. In the case where each peak signal of the up period and the down period is paired, the angle θm of the target is derived by Expression 1.

[Expression 1]

$$\theta_m = \frac{\theta_{up} + \theta_{dn}}{2} \quad (1)$$

In this instance, the information about the frequency of the peak signal corresponds to the information about the distance of the target and the relative speed, but information about the plurality of targets may be included in the frequency of one peak signal. For example, in the position information of the target with respect to the vehicle CR, there is a case where the information about the plurality of targets having the same distance value and the different angle value is included in the peak signal of the same frequency. In this instance, since the phase information about the reflection waves from the different angle is different from each other, the signal processing unit 18 derives the plurality of target information which exists at different angle in one peak signal, based on the phase information of each reflection wave.

Next, the signal processing unit 18 performs a pairing process of pairing the peak signal of the up period and the peak signal of the down period (step S105). The pairing process is performed by, for example, calculation using a Mahalanobis distance. Specifically, before the radar apparatus 1 is mounted to the vehicle CR, the peak signal of the up period and the peak signal of the down period are experimentally paired in advance. Among them, plural data, that is, normal-paired data paired in a correct combination and mis-paired data paired in a wrong combination, is acquired. An average value for every three parameters of the plurality of normal-paired data is derived from three parameter values of a difference in values of the signal levels, a difference in values of the angle, and a difference in values of the signal levels of angular spectrum between the peak signal of the up period and the peak signal of the down period in each normal-paired data, and then is stored in the memory 18s.

When the signal processing unit 18 derives the target information after the radar apparatus 1 is mounted to the vehicle CR, the Mahalanobis distance is derived by Expression 2 below using three parameters of all combinations of the peak signal of the up period and the peak signal of the down period among the peak signals acquired in the current process, and the average value for every three parameters derived above.

[Expression 2]

$$D_M(x) = \sqrt{(x-\mu)^T \Sigma^{-1} (x-\mu)} \quad (2)$$

The signal processing unit 18 derives the paired data of the current process, of which the Mahalanobis distance is minimized, as the normal-paired data. Herein, the Mahalanobis distance is a value of one group represented by a multivariable vector x=(x1, x2, x3), for example, in which an average is μ=(μ1, μ2, μ3)T and a covariance matrix is Σ. In this instance, μ1, μ2, and μ3 represent values of three parameters of the normal-paired data, and x1, x2, and x3 represent values of three parameters of the paired data of the current process.

Subsequently, the signal processing unit 18 derives the vertical distance and the relative distance of the normal-paired data using parameter values of the normal-paired data in the pairing process and Expressions 3 and 4 below. Herein, among the expressions, fup denotes a frequency corresponding to the peak signal of the up period, fdn denotes a frequency corresponding to the peak signal of the down period, and c denotes speed of light (speed of wave). Further, in the expressions, ΔF denotes a frequency deviation width, fm denotes repetition frequency of a modulation wave, and V denotes relative speed.

[Expression 3]

$$R = \frac{(f_{up} + f_{dn}) \cdot c}{2 \times (4 \times \Delta F \times f_m)} \quad (3)$$

[Expression 4]

$$V = \frac{(f_{up} - f_{dn}) \cdot c}{2 \times (4 \times \Delta F \times f_m)} \quad (4)$$

Further, the signal processing unit 18 derives the vertical distance of the normal-paired data from the information about the angle θm derived by Equation 1, through the calculation using a triangle function.

Subsequently, the signal processing unit 18 performs a process of judging whether a temporally consecutive relation exists between the current paired data paired by the current target deriving process and the previous paired data determined by the previous process (step S106). The case where the temporally consecutive relation (having continuity) exists between both data means, for example, a case where the predicted paired data predicting the current paired data is generated based on the previous paired data, and the difference value between the vertical distances, the horizontal distances and the relative speeds of the current paired data and the predicted paired data is within a predetermined value. If there is the continuity, it is judged that the target derived by the current processing is identical to the target derived by the previous processing. In this instance, if a plurality of the current paired data exists within the predetermined value, the signal processing unit 18 may judge whether the current paired data having the lowest difference value between the predicted paired data and the current paired data has the temporally consecutive relation with the previous paired data.

Further, in a case where the difference value between the vertical distances, the horizontal distances and the relative speeds of the current paired data and the predicted paired data is not within the predetermined value, the signal processing unit 18 judges that the temporally consecutive relation (having no continuity) exists between the current paired data and the previous paired data. The paired data judged that there is no continuity becomes data (newly paired data) which is first derived in the current target deriving process. If it is judged in the continuity judgment that there is continuity predetermined consecutive times (i.e., it is judged that it is the same target, the signal processing unit 18 performs the process of determining the detected target as the true target.

Subsequently, in the case where the temporally consecutive relation exists between the current paired data and the previous paired data, the signal processing unit 18 performs a filtering process of the values of the vertical distances, the horizontal distances and the signal levels between the current paired data and the predicted paired data (step S107). The signal processing unit 18 derives the paired data (paired data corresponding to the past) which is subjected to the filtering process, as the target information of the current processing.

For example, if the temporally consecutive relation exists between them, the signal processing unit 18 performs weighting of a value 0.75 for the horizontal distance of the predicted paired data, and weighting of a value 0.25 for the horizontal distance of the current paired data, and derives the result obtained by adding both values as the horizontal distance of the previous correspondent paired data of the current target deriving process. Further, the filtering process is performed for the vertical distance, the relative speed and the signal level in the same way. The signal processing unit 18 determines the derived previous correspondent paired data as the current target information.

In this embodiment, the signal processing unit 18 is configured to change whether to perform the filtering process according to the state of the preceding vehicle (the preceding vehicle is changed from the stop state to the start state and vice versa). That is, even in the case where the current paired data and the previous paired data have the temporally consecutive relationship, the signal processing unit determines the current paired data as the current target information, without executing the filtering process when the stopped preceding vehicle starts. The detailed description of the filtering process will be described later.

Next, if plural target information is the target information corresponding to one object, the signal processing unit 18 performs a process of uniting plural target information (step S108). For example, in the case where the transmission wave is emitted from the transmission antenna 13 of the radar apparatus 1, and the transmission wave is reflected from the preceding vehicle, there are plural reflection waves to be received by the reception antenna 14. That is, the reflection waves from a plurality of reflection points arrive at the reception antenna 14 for the same object. Since the signal processing unit 18 derives plural target information based on each reflection wave, plural target information having different position information is finally derived. However, since it is originally the target information about one vehicle, the signal processing unit performs the process of uniting each target information as one to be handled as the target information of the same object. For this reason, if each relative speeds of plural target information are substantially equal to each other, and the vertical distance and the horizontal distance of each target information are within a predetermined range, the signal processing unit 18 regards plural target information as the target information about the same object, and then performs the process of uniting plural target information as the target information corresponding to one target.

The signal processing unit 18 outputs the target information having the high priority which is outputted from the target information united in the process of step S108 to the vehicle control device 2, to the vehicle control device 2 (step S109).

<1-3. Filtering Process>

Figure 7:
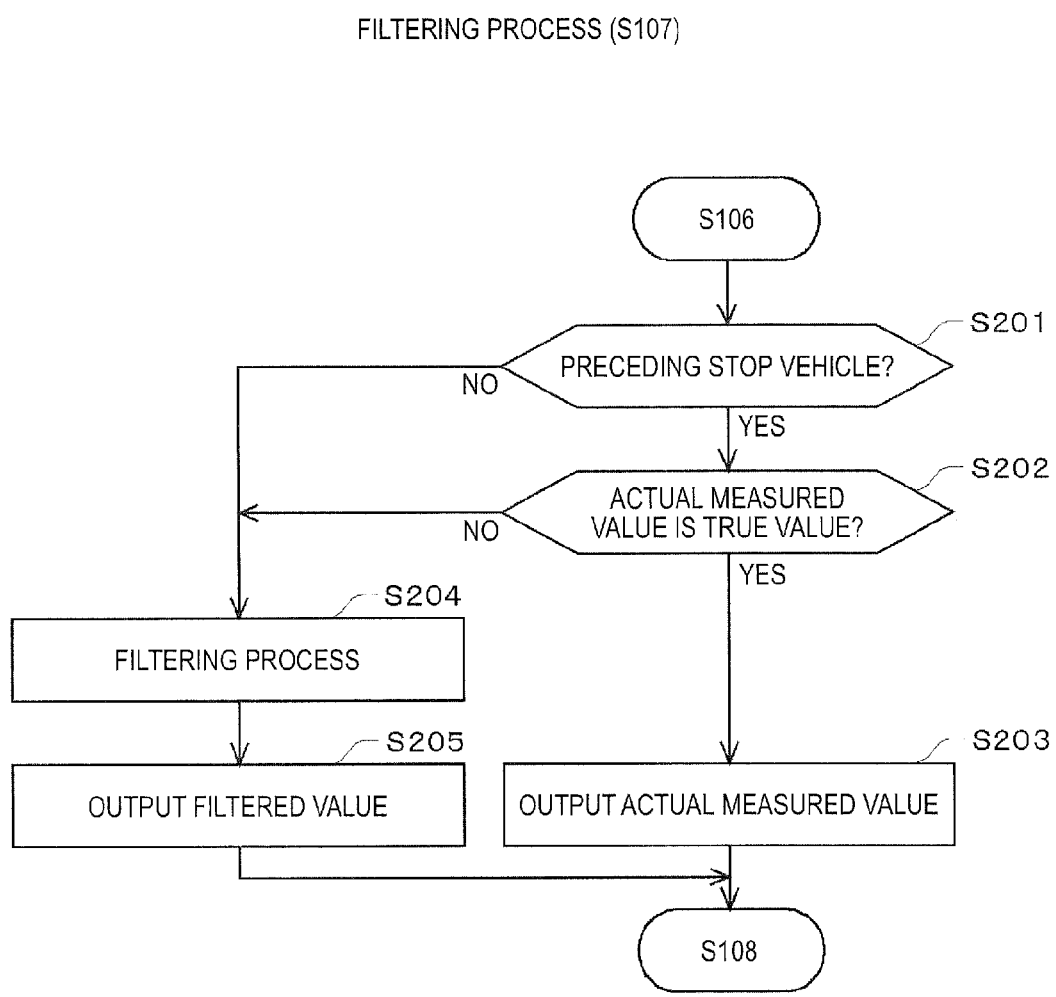
FIG. 7 is a flowchart illustrating a filtering process.

Next, the filtering process (step S107) according to this embodiment will be described in detail. FIG. 7 is a flowchart illustrating the filtering process. The filtering process according to this embodiment changes whether to perform the filtering process according to the state of the preceding vehicle existing in front of the own vehicle.

If there is the temporally consecutive relation between the current pared data and the previous paired data, the signal processing unit 18 judges whether or not the target regarding the current paired data is the preceding vehicle (step S201). The preceding vehicle means a vehicle existing in front of the own vehicle and changing from the stop state to the start state. Accordingly, the judgment on whether or not the target is the preceding stop vehicle is performed by judging whether or not one preceding vehicle exists in the same lane as the own vehicle, or judging whether or not the vehicle drives in a predetermined speed. For example, the signal processing unit 18 judges whether or not the vertical distance of the preceding vehicle is equal to or less than a first predetermined distance corresponding to the distance in the case of changing from the stop state to the start state, and judges whether or not the horizontal distance is within the predetermined distance representing that the preceding vehicle is positioned in the same traffic lane as the own vehicle. Further, the signal processing unit 18 judges whether or not the speed of the preceding vehicle is within the predetermined speed corresponding to the speed in the case of changing from the stop state to the start state.

If the current paired data relates to the preceding stop vehicle (YES in step S201), the signal processing unit 18 judges whether or not an actual measured value is a true value (step S202). The actual measured value means information about the target, such as a value of the signal level derived from the current paired data. Further, the case where the actual measured value is the true value means a case having a high possibility that the derived value is correct as a value of the target. In this embodiment, in the case where the peak signal level regarding the angle derived from the current paired data is equal to or more than a threshold value, the signal processing unit 18 judges that the current paired data is the true value. That is, in this instance, it is judged that the reliability of the target information is high. The threshold value may be obtained by appropriately setting a value to increase the reliability of the target information.

If the actual measured value is the true value (YES in step S202), the signal processing unit 18 judges that the preceding vehicle starts to start, and thus outputs the actual measured value without performing the filtering process (step S203). That is, the signal processing unit 18 outputs the current paired data as the determined paired data of the current process, and uses it in the next process, that is, the uniting process (step S108).

Meanwhile, if the target regarding the current paired data is not the preceding stop vehicle (NO in step S201), or if the actual measured value is not the true value (NO in step S202), the signal processing unit 18 performs a common filtering process (step S204). That is, the signal processing unit 18 performs the filtering process of the current paired data and the predicted paired data to drive the previous correspondent paired data. The signal processing unit 18 outputs a value (previous correspondent paired data of the current process) obtained by performing the filtering process (step S205). That is, the signal processing unit 18 outputs the previous correspondent paired data as the determined paired data of the current process, and uses it in the next process, that is, the uniting process (step S108).

Figure 8:
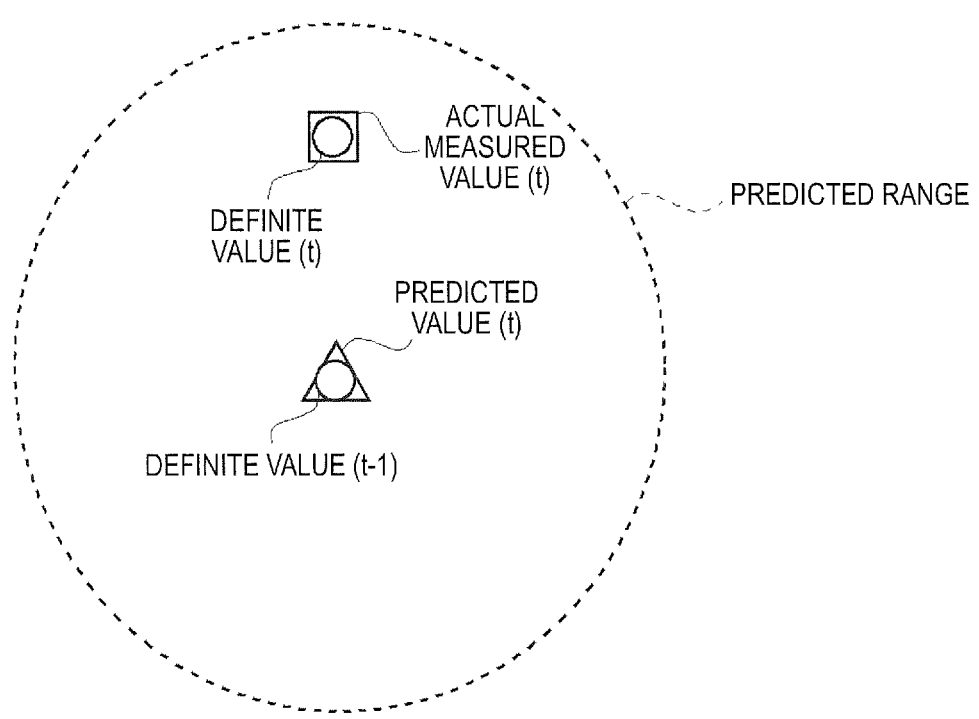
FIG. 8 is a diagram illustrating a process of determining paired data according to the present invention.
Figure 8:
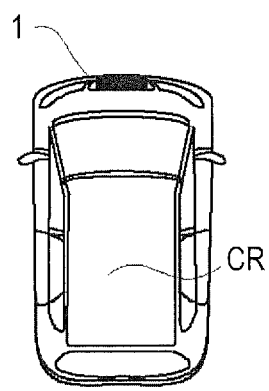
Figure 9:
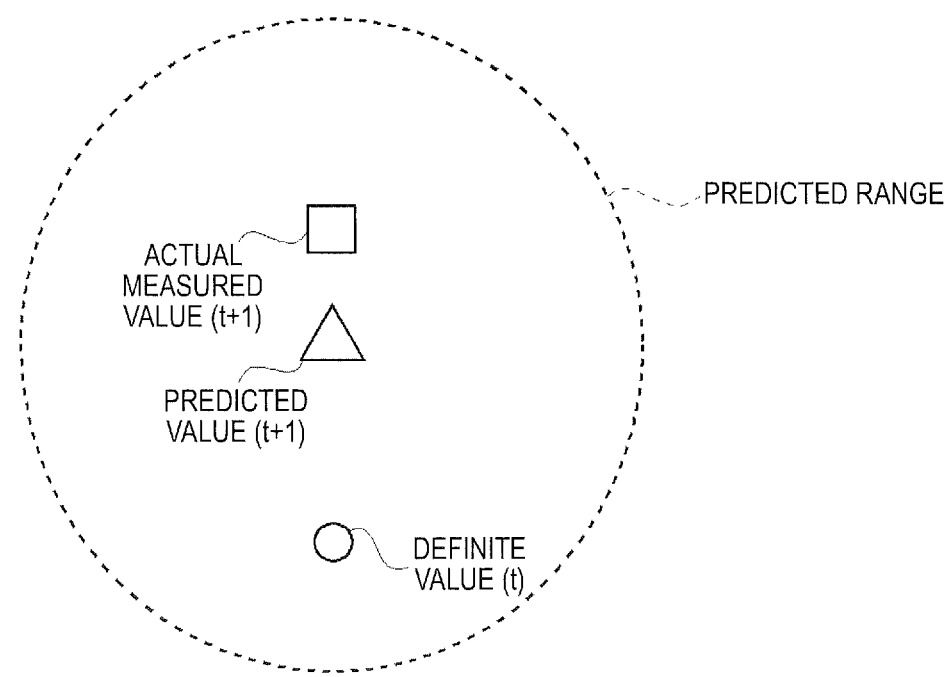
FIG. 9 is a diagram illustrating the process of determining paired data according to the present invention.
Figure 9:
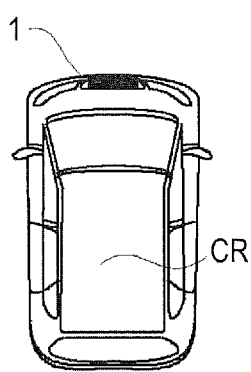

The filtering process according to this embodiment will be described with reference to the drawings. FIGS. 8 and 9 are diagrams illustrating the process of determining the current paired data of the preceding vehicle, and show the state in which the preceding vehicle starts from the stop state. The definite values in FIGS. 8 and 9 indicate the determined paired data, the predicted values indicate the predicted paired data to predict the current paired data, and the actual measured values indicate the current paired data. FIGS. 8 and 9 schematically show the position derived from each paired data. Further, "t" attached to each value indicates a time representing a timing of the deriving process.

As illustrated in FIG. 8, in the state in which the preceding vehicle is stopped at the time of the previous deriving process, the current predicted value (t) becomes the same position as the definite value (t−1). The signal processing unit 18 judges whether the actual measured value (t) of the current process is within the predicted range around the predicted value (t). If it is YES, it is judged that the definite value (t−1) and the actual measured value (t) have the temporally continuous relationship. FIG. 8 shows the state in which the preceding vehicle starts from the stop state, and it is judged that the actual measured value (t) becomes a position spaced apart from the predicted value (t), but they have the temporally continuous relationship since it is within the predicted range. In this instance, in the case where the actual measured value (t) meets the above conditions (vertical distance, horizontal distance and speed) to judge whether the target is the preceding stop vehicle, the signal processing unit 18 judges whether or not the actual measured value (t) is a true value. If it is the true value, the signal processing unit 18 outputs the actual measured value (t), without performing the common filtering process. That is, the signal processing unit 18 judges that the target is the preceding stop vehicle, and determines the actual measured value (t) as the definite value (t).

As illustrated in FIG. 9, in the deriving process of the next time, the predicted range is set on the basis of the predicted value (t+1) derived based on the definite value (t). For this reason, even in the case where the preceding vehicle further travels, the actual measured value (t+1) is within the predicted range, the temporally continuous relationship can be continuously maintained. Even in this instance, if the preceding vehicle is the preceding stop vehicle, the signal processing unit 18 outputs the actual measured value (t+1) as the definite value (t+1).

As illustrated in FIG. 8, in the case where the preceding vehicle starts from the stop state, the predicted value (t) is significantly different from the actual measured value (t). Therefore, the definite value (t) becomes a value different from the original value, if the conventional filtering process is performed. For this reason, it is possible to maintain the continuity by setting the actual measured value (t) as the definite value (t), without performing the filtering process, thereby preventing the preceding vehicle from being disappeared.

Figure 10:
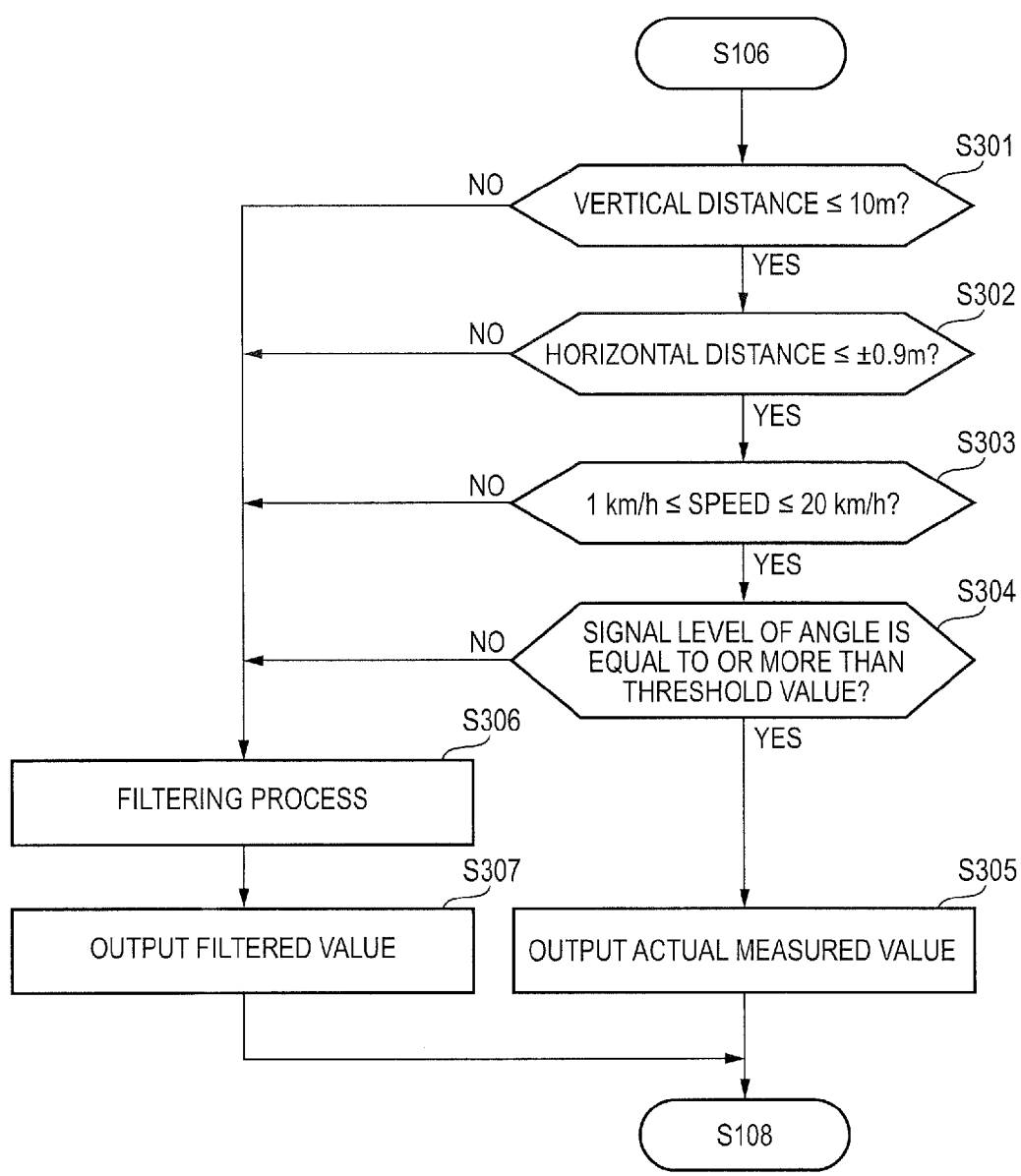
FIG. 10 is a flowchart illustrating a filtering process.

The filtering process according to this embodiment will now be described in detail. FIG. 10 is a flowchart illustrating the filtering process according to this embodiment. First, the signal processing unit 18 judges whether or not the vertical distance of the target object is 10 m or less (step S301). This is a process of verifying that the target exists equal to or less than the first predetermined distance corresponding to the distance in the case where the target is changed from the stop state to the start state. The vertical distance can be derived from the current paired data by the above-described method.

The vertical distance means a distance of which the reflection wave reflected from the target reaches the reception antenna of the radar apparatus 1, as described above, but the vertical distance may be a distance of the target with respect to the vehicle CR in a direction of a reference axis BL imaginarily extending to a traveling direction of the vehicle CR. In this instance, the horizontal direction is derived by performing the calculation of trigonometric function using based on information about an angle of the target with respect to the vehicle CR and the vertical distance.

If the vertical distance is 10 m or less (YES in step S301), the signal processing unit 18 judges whether or not the horizontal direction of the target is ±0.9 m or less (step S302). This is a process of verifying whether or not the target exists within the predetermined distance representing that the target is positioned in the same traffic lane as the own vehicle. The horizontal direction can be also derived from the current paired data by the above-described method.

If the horizontal direction is ±0.9 m or less (YES in step S302), the signal processing unit 18 judges whether or not the speed of the target object is 1 km/h or more and 20 km/h or less (step S303). This is a process of judging whether or not the target travels in a speed within the predetermined speed corresponding to the speed in the case of changing from the stop state to the start state. The speed of the target can be also derived from the current paired data.

The processes of step S301 to step S303 are processes of judging whether or not the target object is the preceding stop vehicle. That is, in the case where the vertical distance is 10 m or less, the horizontal distance is ±0.9 m or less, and the speed is 1 km/h or more and 20 km/h or less, it is judged that the target object is the preceding stop vehicle. In this embodiment, although the conditions of the vertical distance and the horizontal distance are set to 10 m or less and ±0.9 m or less, respectively, it is not limited thereto. The condition may be a distance capable of judging that the target object is the preceding vehicle, and can be appropriately set. Further, although the speed is 1 km/h or more and 20 km/h or less, it is not limited thereto. The condition may be a speed capable of judging that the target object is changed from the stop state to the start state, and can be appropriately set. Also, the condition of 1 km/h or more as the speed condition may be eliminated, and the condition may be 20 km/h or less. In this instance, the case where the preceding vehicle is stopped is included.

If the speed is 1 km/h or more and 20 km/h or less (YES in step S303), the signal processing unit 18 judges whether or the level of the peak signal regarding the angle is equal to or more than the threshold value (step S304). This is a process of judging whether or not the current pared data is a true value. If the signal level is equal to or more than the threshold value (YES in step S304), there is high reliability in which the preceding vehicle exists at the angle, and there is high possibility in that the current pared data is the true value. For this reason, the signal processing unit 18 determines the actual measured value (i.e., value of the current paired data) as the current paired data, and then outputs it (step S305).

In each process of step S301 to step S304, if any one condition is not satisfied, the signal processing unit 18 performs the common filtering process (step S306). That is, the signal processing unit filters the current paired data and the predicted paired data. The reason is that if any one of the processes is not satisfied, there is high possibility in that the target object is not the preceding stop vehicle, or the value of the current paired data is not the true value.

The signal processing unit 18 determines the value (previous correspondent paired data) derived from the filtering process, and then outputs it (step S307).

In this way, in the case where the preceding vehicle is changed from the stop state to the start state, that is, it is judged that the value of the current paired data is the true value, the signal processing unit 18 outputs the current paired data actually derived, without performing the filtering process. Accordingly, the predicted value and the actual measured value are apart from each other, and thus the data loses the temporal continuity. Therefore, it is possible to prevent the preceding vehicle from being disappeared.

2. Second Embodiment

Next, the second embodiment will be described. The first embodiment is configured to judge whether or not the target is the preceding stop vehicle, by use of the speed, but it may be configured not to use the speed, but to use the relative speed. For this reason, the second embodiment will be described about the configuration to judge whether or not the target is the preceding stop vehicle by use of the relative speed. In this embodiment, the preceding stop vehicle means a preceding vehicle changed from the stop state to the start state.

<2-1. Configuration and Overall Processing>

The vehicle control system according to the second embodiment includes the same configuration as that of the vehicle control system shown in FIG. 4. Further, the process of deriving the target by the radar apparatus 1 is identical to that described in the first embodiment, except for the filtering process (step S107). For this reason, the description of the filtering process will be made mainly of the different point from the first embodiment.

<2-2. Filtering Process>

Figure 11:
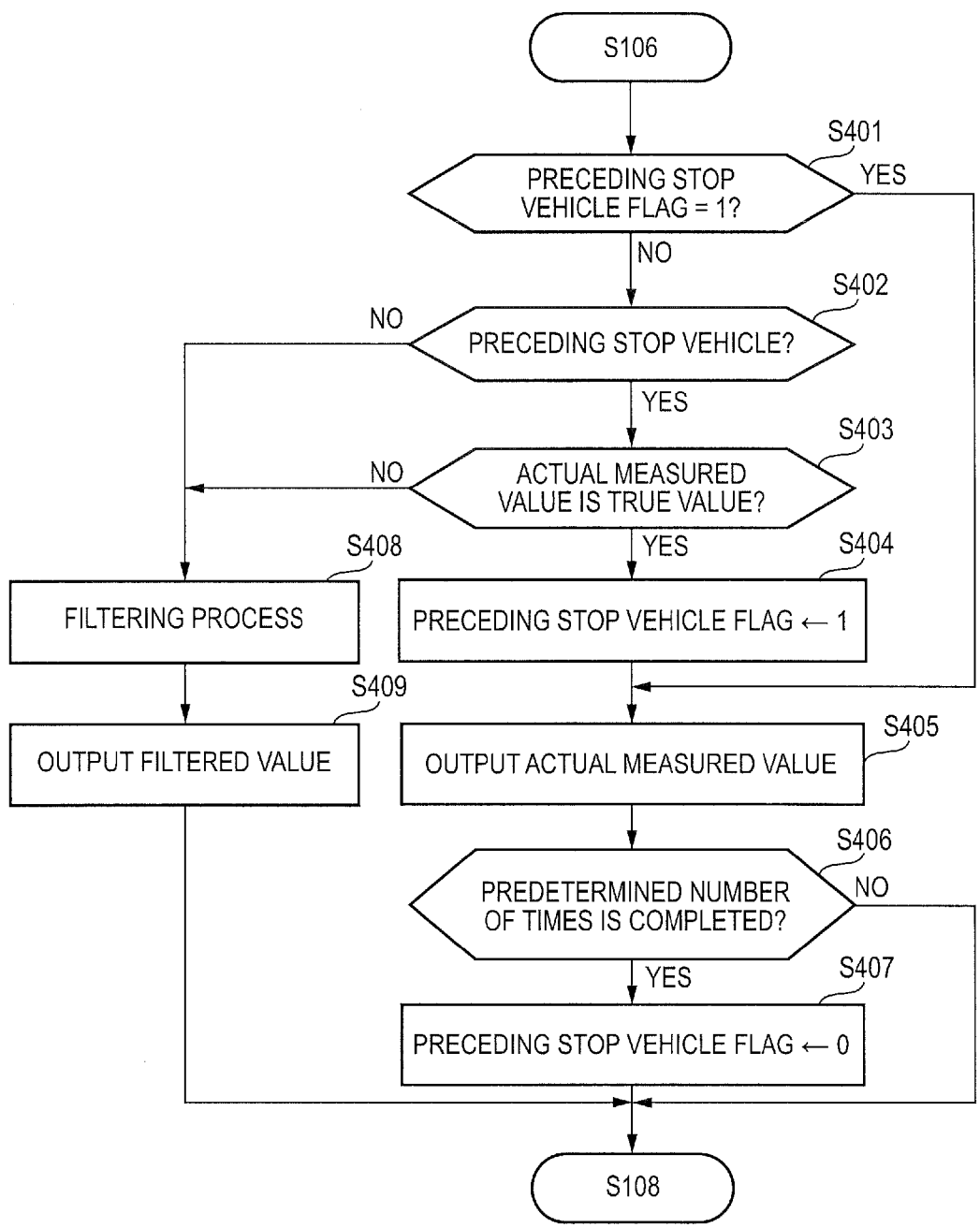
FIG. 11 is a flowchart illustrating the filtering process.

The filtering process according to the second embodiment will be described in detail. FIG. 11 is a flowchart illustrating the filtering process (step S107) according to the second embodiment.

If there is the temporally consecutive relation between the current pared data and the previous paired data, the signal processing unit 18 judges whether or not a preceding stop vehicle flag is 1 (whether it is set) (step S401). The preceding stop vehicle flag means a flag representing whether or not the derived target is the preceding stop vehicle. In this embodiment, if it is judged that the target is the preceding stop vehicle, the predetermined number of times of filtering processes is not performed in the subsequent driving process to output the actual measured value. For this reason, if it is judged that the target is the preceding stop vehicle, the flag is maintained as one until the predetermined number of times of the driving processes is completed. Accordingly, if the preceding stop vehicle flag is 1 (YES in step S401), the signal processing unit 18 performs a process of outputting the actual measured value, without judging whether or not the target is the preceding stop vehicle (step S404).

If the preceding stop vehicle flag is not 1 (NO in step S401), the signal processing unit 18 judges whether or not the target object is the preceding stop vehicle (step S402). The case where the preceding stop vehicle flag is not 1 means a case where the flag is 0 (case where it is cleared). In this embodiment, the judgment whether or not the target is the preceding stop vehicle is performed based on the judgment whether or not the target is a vehicle existing in front of the own vehicle, and the relative speed of the target with respect to the own vehicle.

For example, the signal processing unit 18 judges whether or not the vertical distance of the preceding vehicle is equal to or less than a first predetermined distance corresponding to the distance in the case of changing from the stop state to the start state, and judges whether or not the horizontal distance is within the predetermined distance representing that the preceding vehicle is positioned in the same traffic lane as the own vehicle. Further, the signal processing unit 18 judges whether or not the relative speed of the preceding vehicle corresponds to the change of the relative speed in the case of changing from the stop state to the start state. The judgment whether or not the target is the preceding stop vehicle will be described in detail.

If it is judged that the target is the preceding stop vehicle (YES in step S402), the signal processing unit 18 judges whether or not the actual measured value is the true value (step S403). The judgment whether the actual measured value is the true value may be performed by the same way as step S202 described above.

If the actual measured value is the true value (YES in step S403), the signal processing unit 18 sets the preceding stop vehicle flag to 1 (step S404). The reason is to output the actual measured value in the predetermined number of times of the driving processes after the next process, regardless of whether or not the target object is the preceding stop vehicle.

Subsequently, the signal processing unit 18 outputs the actual measured value (step S405). That is, the signal processing unit 18 outputs the current paired data as the determined paired data, and uses it in the next process, that is, the uniting process (step S108).

The signal processing unit 18 judges whether or not the output of the actual measured value is completed by the predetermined number of times (step S406). Since the predicted value and the actual measured value are apart from each other in the case where the target is the preceding stop vehicle, the actual measured value is outputted without performing the filtering process. However, when the stop vehicle starts, there is possibility in that the same situation may occur several times after that. In this embodiment, the subsequent predetermined number of times is set to output the actual measured value. The predetermined number of times is preferably set to the number of times so that the preceding vehicle is not the preceding stop vehicle, and may be arbitrarily set.

If the predetermined number of times is completed (YES in step S406), the signal processing unit 18 sets the preceding stop vehicle flag to 0. Next, it proceeds to the next process (step S108). If the predetermined number of times is not completed (NO in step S406), it proceeds to the next process (step S108) while the preceding stop vehicle flag is maintained to 1.

If the target is not the preceding stop vehicle (NO in step S402), or if the actual measured value is not the true value (NO in step S403), the signal processing unit 18 performs the common filtering process (step S408). That is, the signal processing unit 18 performs the filtering process of the current paired data and the predicted paired data to drive the previous correspondent paired data. The signal processing unit 18 outputs a value (previous correspondent paired data of the current process) obtained by performing the filtering process (step S409). That is, the signal processing unit 18 outputs the previous correspondent paired data as the determined paired data of the current process, and uses it in the next process, that is, the uniting process (step S108).

Figure 12:
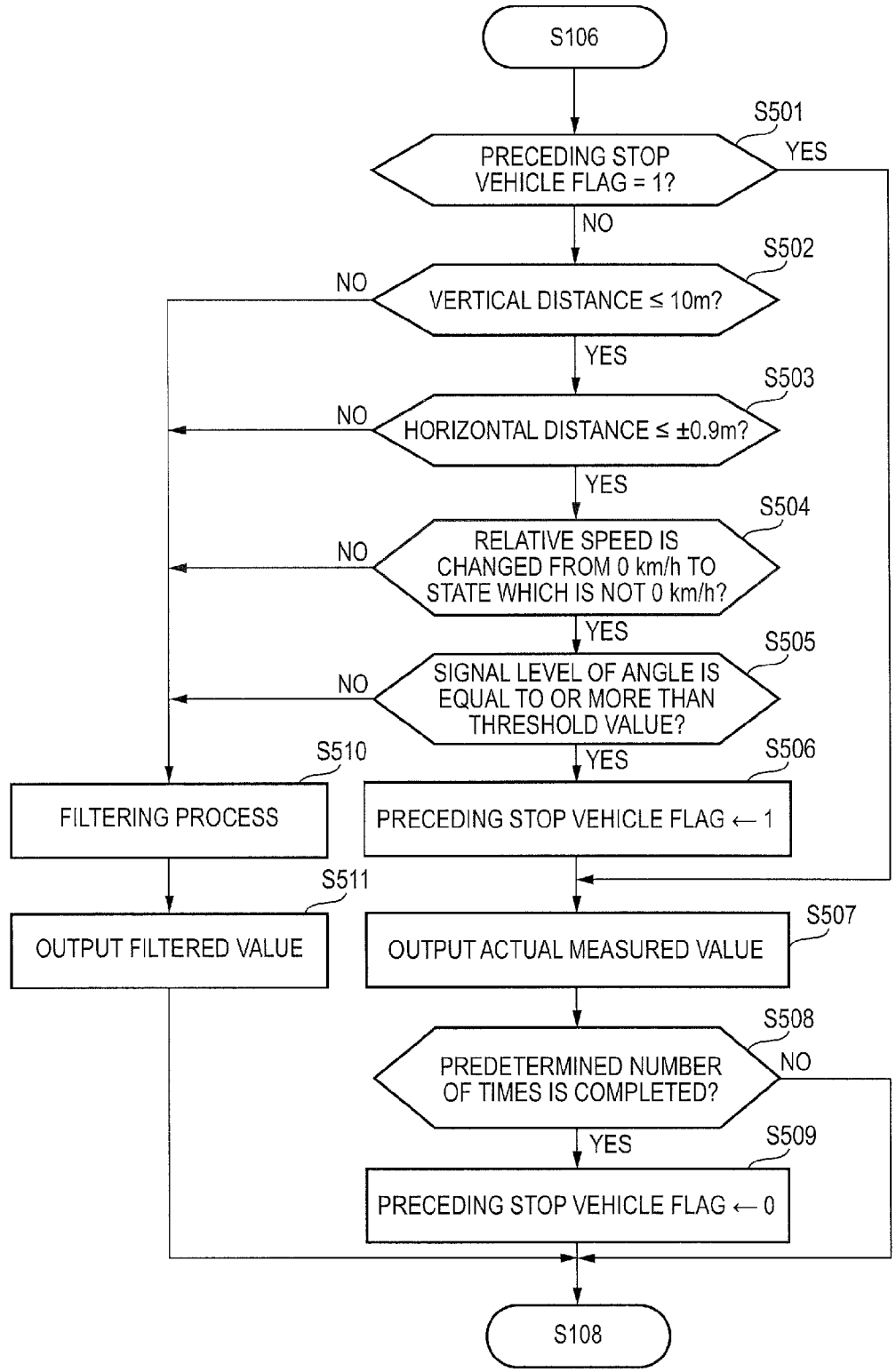
FIG. 12 is a flowchart illustrating the filtering process.

The filtering process according to this embodiment will be described in detail. FIG. 12 is a flowchart illustrating the filtering process according to this embodiment. If there is the temporally consecutive relation between the current pared data and the previous paired data, the signal processing unit 18 judges whether or not the preceding stop vehicle flag is 1 (step S501). If the preceding stop vehicle flag is 1 (YES in step S501), the signal processing unit 18 outputs the actual measured value (step S507).

If the preceding stop vehicle flag is not 1 (NO in step S501), the signal processing unit 18 judges whether or not the vertical distance of the target object is 10 m or less (step S502). This is a process of verifying the target exists equal to or less than the first predetermined distance corresponding to the distance in the case of changing from the stop state to the start state. The method of deriving the vertical distance is similar to step S301 described above.

If the vertical direction is 10 m or less (YES in step S502), the signal processing unit 18 judges whether or not the horizontal distance of the target object is +0.9 m or less (step S503). This is a process of judging whether or not the target exists within a predetermined distance range representing that the target is positioned in the same traffic lane as the own vehicle. The horizontal distance can be also derived by the above-described method.

If the horizontal direction is ±0.9 m or less (YES in step S503), the signal processing unit 18 judges whether or not the relative speed of the target object is changed from 0 km/h to a state which is not 0 km/h (step S504). This is a process of judging whether the target is changed from the stop state to the start stop. The case corresponding to the condition is, for example, a case where the preceding vehicle starts from the state in which the own vehicle and the preceding vehicle are stopped. Accordingly, in the case where the relative speed derived from the previous paired data is 0 km/h, and the relative speed derived from the current paired data is not 0 km/h, the signal processing unit 18 judges that the condition is met. In this instance, the relative speed can be derived by the above-described method.

The processes of step S502 to step S504 are to judge whether or not the target object is the preceding stop vehicle. That is, if the vertical distance is 10 m or less, the horizontal distance is +0.9 m or less, and the relative speed is changed from 0 km/h to the state which is not 0 km/h, the target object is judged as the preceding stop vehicle. In this instance, although the conditions of the vertical distance and the horizontal distance are set to 10 m or less and ±0.9 m or less, it is not limited thereto. The condition is preferably set to the distance capable of judging that the target object is the preceding vehicle, and may be appropriately set.

If the relative speed is changed from 0 km/h to the state which is not 0 km/h (YES in step S504), the signal processing unit 18 judges whether or the level of the peak signal regarding the angle is equal to or more than the threshold value (step S505). This is a process of judging whether or not the current pared data is a true value.

If the signal level is equal to or more than the threshold value (YES in step S505), the signal processing unit 18 sets the preceding stop vehicle flag to 1 (step S506). After that, the signal processing unit 18 outputs the actual measured value (step S507), judges whether or not the output of the actual measured value is completed by the predetermined number of times (step S508), and performs a process of clearing the preceding stop vehicle flag to 0 (step S509). Step S506 to step S509 are similar to step S404 to step S407 described above.

In each process of step S502 to step S505, if any one condition is not satisfied, the signal processing unit 18 performs the common filtering process (step S510), and outputs the filtered value (step S511). Each of these processes is similar to steps S408 and step S409.

In this way, in the case where the preceding vehicle is changed from the stop state to the start state, that is, it is judged that the value of the current paired data is the true value, the signal processing unit 18 outputs the current paired data actually derived, without performing the filtering process. Accordingly, the predicted value and the actual measured value are apart from each other, and thus the data loses the temporal continuity. Therefore, it is possible to prevent the preceding vehicle from being disappeared.

3. Third Embodiment

Next, the third embodiment will be described. In the second embodiment, the configuration has been described to judge the case where the preceding vehicle starts from the state in which the own vehicle and the preceding vehicle stop, by use of the relative speed. In the third embodiment, a configuration will be described in which a case where the preceding vehicle is accelerated or decelerated from the state in which the own vehicle follows up the preceding vehicle, by use of the relative speed. For this reason, the preceding stop vehicle in this embodiment means a vehicle which is accelerated or decelerated from the follow-up traveling state.

<3-1. Configuration and Overall Processing>

The vehicle control system according to the third embodiment includes the same configuration as that of the vehicle control system shown in FIG. 4. Further, the process of deriving the target by the radar apparatus 1 is identical to that described in the first embodiment, except for the filtering process (step S107). Also, the filtering process is substantially identical to the second embodiment. For this reason, the description of the filtering process will be made mainly of the different point from the second embodiment.

<3-2. Filtering Process>

Figure 13:
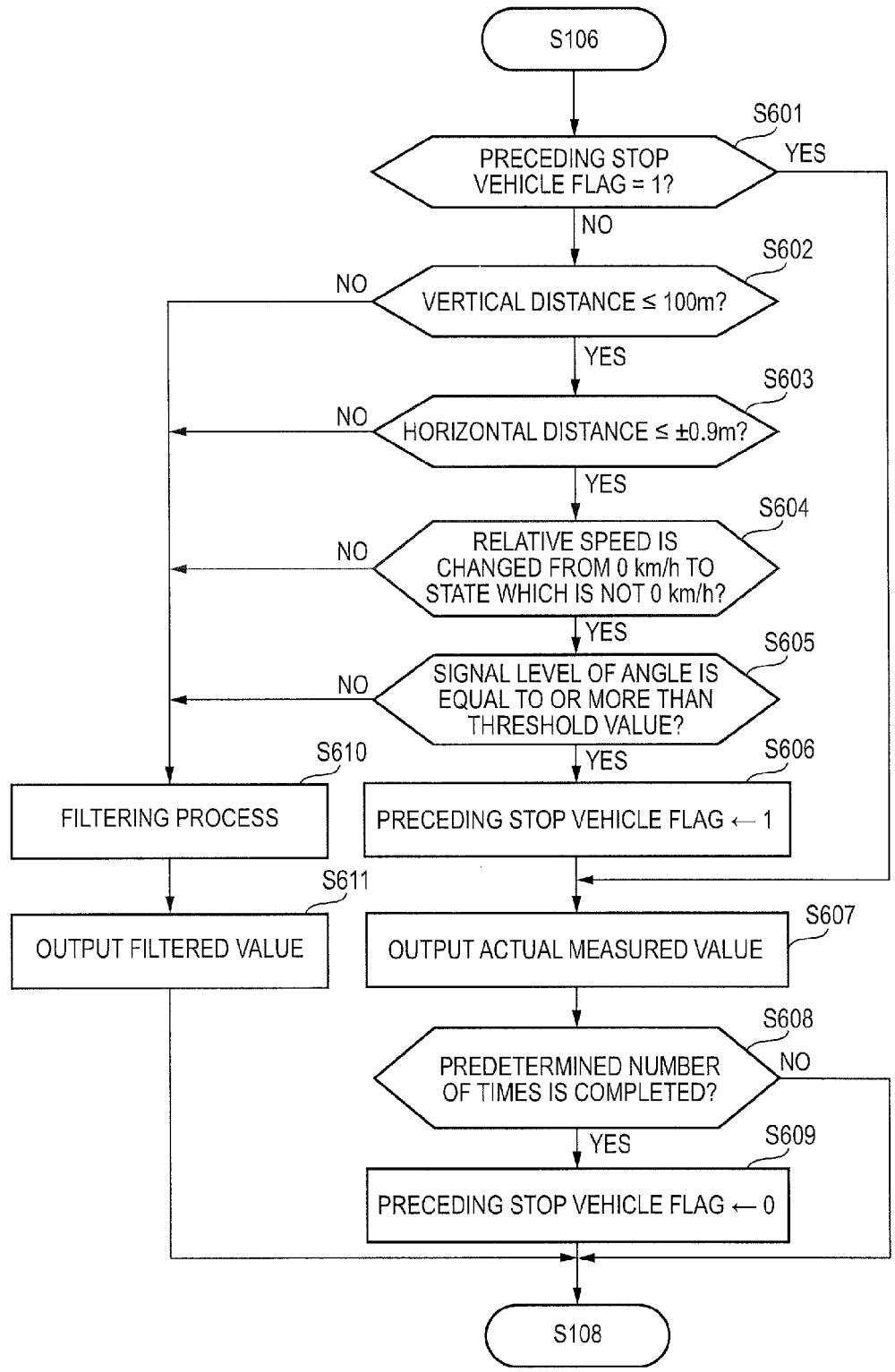
FIG. 13 is a flowchart illustrating the filtering process.

The filtering process according to the third embodiment will be described in detail. FIG. 13 is a flowchart illustrating the filtering process (step S107) according to the third embodiment.

Step S601 to step S611 illustrated in the flowchart in FIG. 13 are substantially identical to each process of step S501 to S511 illustrated in the flowchart in FIG. 12 which are described in the second embodiment, except for step S602 and step S604. Therefore, step S602 and step S604 will be described.

If the preceding stop vehicle flag is not 1 (NO in step S601), the signal processing unit 18 judges whether or not the vertical distance of the target object is 100 m or less (step S602). This is a process of verifying that the preceding vehicle exists equal to or less than the second predetermined distance representing that the preceding vehicle is normally, traveling. In the case where the own vehicle follows up the preceding vehicle while normally traveling, the own vehicle generally travels while securing a constant inter-vehicle distance. A distance capable of verifying the existence of the preceding vehicle is conditioned. Accordingly, when the condition is as described above, it is not limited to 100 m. In this instance, the method of deriving the vertical distance is identical to step S502 described above.

If the vertical distance is 100 m or less (YES in step S602), the signal processing unit 18 judges whether or not the horizontal distance of the target object is ±0.9 m or less (step S603). If the horizontal direction is ±0.9 m or less, the signal processing unit judges whether or not the relative speed of the target object is changed from 0 km/h to a state which is not 0 km/h (step S604). This is a process of judging whether or not the target is changed from the state in which the target travels in the substantially same speed as the own vehicle, to a decelerated or accelerated state. Accordingly, in the case where the relative speed derived from the previous paired data is 0 km/h, and the relative speed derived from the current paired data is not 0 km/h, the signal processing unit 18 judges that the condition is met. The relative speed can be derived by the above-described method.

When the own vehicle follows up the preceding vehicle, the relative speed does not exactingly maintain 0 km/h, but the vehicle usually travels while the relative speed is varied within a certain range. For this reason, in this embodiment, the case where the relative speed of the target is changed from 0 km/h to the state which is not 0 km/h contains the case where the relative speed is changed from substantially 0 km/h to a state which is not substantially 0 km/h. The substantially 0 km/h means a relative speed having a width capable of discriminating that the target follows up. For example, the relative speed may be set to −3 km/h to +3 km/h, or −5 km/h to +5 km/h, but it is not limited thereto, and can be arbitrarily set. Accordingly, it can be said that if the relative speed is within the range, the relative speed is 0 km/h, and if the relative speed exceeds the range, the relative speed is not 0 km/h.

Similar to the second embodiment, the processes of step S602 to step S604 are processes of judging whether or not the target object is the preceding stop vehicle. In the relative speed is changed from 0 km/h to the state which is not 0 km/h (YES in step S604), the signal processing unit 18 judges whether or not the level of the peak signal relating to the angle is equal to or more than the threshold value (step S605), and then performs the same process as the second embodiment.

In this way, when the own vehicle follows up the preceding vehicle, in the case where it is judged that the value of the current paired data is the true value even though the preceding vehicle is accelerated or decelerated, the signal processing unit 18 outputs the current paired data actually derived, without performing the filtering process. Accordingly, the predicted value and the actual measured value are apart from each other, and thus the data loses the temporal continuity. Therefore, it is possible to prevent the preceding vehicle from being disappeared.

4. Modified Examples

Hereinbefore, the embodiments of the present invention have been described. However, the present invention is not limited to those embodiments, and various modified examples may be made. Hereinafter, such modified examples will be described. On the other hand, all forms, including forms described in the above-described embodiments and forms to be described hereinafter, can be appropriately combined.

In the second and third embodiments, the filtering process performed when the preceding stop vehicle starts, and the filtering process performed when the preceding vehicle following up is accelerated or decelerated have been separately described, but both filtering processes may be performed in series of filtering processes.

For example, if the preceding stop vehicle flag is not 1, the signal processing unit 18 performs a process of judging whether or not the speed of the preceding vehicle derived by the previous process is 0 km/h. If the previous speed of the preceding vehicle is 0 km/h, the preceding vehicle is stopping, and thus the signal processing unit 18 performs the process after step S502. Meanwhile, if the previous speed of the preceding vehicle is not 0 km/h, the preceding vehicle is travelling, and thus the signal processing unit 18 performs the process after step S602.

According to the traveling state of the preceding vehicle, whether to perform the filtering process can be judged, and thus it is possible to prevent the preceding vehicle from being disappeared in the case where the relative speed is changed from 0 km/h to the state which is not 0 km/h.

In the above-described embodiment, it is described that various functions are realized by software through the arithmetic operation of the CPU according the program. However, a part of these functions may be realized by an electrical hardware circuit. By contrast, a part of the functions that are realized by the hardware circuit may be realized by software.

What is claimed is:

1. A radar apparatus capable of extracting peak signals obtained from a difference frequency between a transmitting signal of which a frequency is changed in a predetermined cycle and a receiving signal obtained by receiving a reflection wave of a transmission wave based on the transmitting signal at a target, for a first period at which the frequency of the transmitting signal ascends and for a second period at which the frequency descends, and deriving information about the target based on the extracted peak signals, the radar apparatus comprising:

a predicting unit configured to predict a first current peak signal based on a previously-determined peak signal;

an extracting unit configured to extract a second current peak signal corresponding to the predicted first current peak signal, from among peak signals existing within a predetermined range of the frequency; and a filtering unit configured to perform a filtering process on the predicted first current peak signal and the extracted second current peak signal, and output a result of the filtering process as a current determined peak signal, wherein, if the target derived based on the extracted second current peak signal is a preceding vehicle existing in front of an own vehicle equipped with the radar apparatus, the filtering unit judges whether to perform the filtering process according to a state of the preceding vehicle, and wherein, if the state of the preceding vehicle is changed from a stop state to a start state, the filtering unit outputs the extracted second current peak signal as the current determined peak signal without performing the filtering process.

2. The radar apparatus according to claim 1, wherein if, among the information about the target derived based on the extracted second current peak signal, (i) a level of a peak signal regarding an angle is equal to or more than a threshold value, (ii) a first distance corresponding to a vehicular traveling direction of said own vehicle is equal to or less than a first predetermined distance corresponding to a distance in a case where the preceding vehicle is changed from the stop state to the start state, (iii) a second distance substantially perpendicular to the vehicular traveling direction is within a predetermined distance representing that the preceding vehicle is positioned in the same traffic lane as the own vehicle, and (iv) a speed of the preceding vehicle is within a predetermined speed corresponding to a speed in the case where the preceding vehicle is changed from the stop state to the start state, the filtering unit (a) judges that the preceding vehicle is changed from the stop state to the start state, and then (b) outputs the extracted second current peak signal as the current determined peak signal without performing the filtering process.

3. A radar apparatus capable of extracting peak signals obtained from a difference frequency between a transmitting signal of which a frequency is changed in a predetermined cycle and a receiving signal obtained by receiving a reflection wave of a transmission wave based on the transmitting signal at a target, for a first period at which the frequency of the transmitting signal ascends and for a second period at which the frequency descends, and deriving information about the target based on the extracted peak signals, the radar apparatus comprising:
  a predicting unit configured to predict a first current peak signal based on a previously-determined peak signal;
  an extracting unit configured to extract a second current peak signal corresponding to the predicted first current peak signal, from among peak signals existing within a predetermined range of the frequency; and
  a filtering unit configured to perform a filtering process on the predicted first current peak signal and the extracted second current peak signal, and output a result of the filtering process as a current determined peak signal,
  wherein, if the target derived based on the extracted second current peak signal is a preceding vehicle existing in front of an own vehicle equipped with the radar apparatus, the filtering unit judges whether to perform the filtering process according to a state of the preceding vehicle, and
  wherein, if a relative speed of the preceding vehicle is changed from 0 km/h to a state which is not 0 km/h, the filtering unit outputs the extracted second current peak signal as the current determined peak signal without performing the filtering process.

4. The radar apparatus according to claim 3, wherein if, among the information about the target derived based on the extracted second current peak signal, (i) a level of a peak signal regarding an angle is equal to or more than a threshold value, (ii) a first distance corresponding to a vehicular traveling direction of said own vehicle is equal to or less than a first predetermined distance corresponding to a distance in a case where the preceding vehicle is changed from the stop state to the start state, and (iii) a second distance substantially perpendicular to the vehicular traveling direction is within a predetermined distance representing that the preceding vehicle is positioned in the same traffic lane as the own vehicle, the filtering unit (a) judges that the relative speed of the preceding vehicle is changed from 0 km/h to a state which is not 0 km/h since the preceding vehicle starts from the stop state, and then (b) outputs the current peak signal as the current determined peak signal without performing the filtering process.

5. The radar apparatus according to claim 3, wherein if, among the information about the target derived based on the current peak signal, (i) a level of a peak signal regarding an angle is equal to or more than a threshold value, (ii) a first distance corresponding to a vehicular traveling direction of said own vehicle is equal to or less than a second predetermined distance representing that the preceding vehicle is normally traveling, and (iii) a second distance substantially perpendicular to the vehicular traveling direction is within a predetermined distance representing that the preceding vehicle is positioned in the same traffic lane as the own vehicle, the filtering unit (a) judges that the relative speed of the preceding vehicle is changed from 0 km/h to a state which is not 0 km/h since the preceding vehicle decelerates or accelerates while the own vehicle follows up the preceding vehicle, and then (b) outputs the current peak signal as the current determined peak signal, without performing the filtering process.

6. The radar apparatus according to claim 3, wherein, if the state of the preceding vehicle is changed from a stop state to a start state, the filtering unit outputs the extracted second current peak signal as the current determined peak signal without performing the filtering process.

7. The radar apparatus according to claim 6, wherein if, among the information about the target derived based on the extracted second current peak signal, (i) a level of a peak signal regarding an angle is equal to or more than a threshold value, (ii) a first distance corresponding to a vehicular traveling direction of said own vehicle is equal to or less than a first predetermined distance corresponding to a distance in a case where the preceding vehicle is changed from the stop state to the start state, (iii) a second distance substantially perpendicular to the vehicular traveling direction is within a predetermined distance representing that the preceding vehicle is positioned in the same traffic lane as the own vehicle, and (iv) a speed of the preceding vehicle is within a predetermined speed corresponding to a speed in the case where the preceding vehicle is changed from the stop state to the start state, the filtering unit (a) judges that the preceding vehicle is changed from the stop state to the start state, and then (b) outputs the extracted second current peak signal as the current determined peak signal without performing the filtering process.

8. A signal processing method capable of extracting peak signals obtained from a difference frequency between a transmitting signal of which a frequency is changed in a predetermined cycle and a receiving signal obtained by receiving a reflection wave of a transmission wave based on the transmitting signal at a target, for a first period at which the frequency of the transmitting signal ascends and for a second period at which the frequency descends, and deriving information about the target based on the extracted peak signals, the signal processing method comprising:
  (a) predicting a first current peak signal based on a previously-determined peak signal;
  (b) extracting a second current peak signal corresponding to the predicted first current peak signal, from among peak signals existing within a predetermined range of the frequency; and
  (c) performing a filtering process on the predicted first current peak signal and the extracted second current peak signal, and output a result of the filtering process as a current determined peak signal,
  wherein if the target derived based on the extracted second current peak signal is a preceding vehicle existing in front of an own vehicle equipped with the radar apparatus, the step (c) includes a step of judging whether to perform the filtering process according to a state of the preceding vehicle.

* * * * *